Feb. 8, 1966 G. W. WELLS 3,234,336

MAGNETIC STORAGE REPERTORY DIALER

Filed April 20, 1962 3 Sheets-Sheet 1

INVENTOR
G. W. WELLS
BY Edwin B. Cave
ATTORNEY

Feb. 8, 1966 G. W. WELLS 3,234,336

MAGNETIC STORAGE REPERTORY DIALER

Filed April 20, 1962 3 Sheets-Sheet 2

INVENTOR
G. W. WELLS
BY Edwin B. Cave
ATTORNEY

MAGNETIC STORAGE REPERTORY DIALER

Filed April 20, 1962

INVENTOR
G. W. WELLS
BY Edwin B. Cave
ATTORNEY

United States Patent Office 3,234,336

Patented Feb. 8, 1966

3,234,336
MAGNETIC STORAGE REPERTORY DIALER

George W. Wells, Springfield, N.J., assignor to Bell Telephone Laboratories, Incorporated, New York, N.Y., a corporation of New York Filed Apr. 20, 1962, Ser. No. 188,995
12 Claims. (Cl. 179—90)

This invention relates to telephone calling devices and more particularly to repertory dialers. The general object of the invention is to improve repertory dialer substation apparatus of the type employing magnetic drum storage.

In the art of telephone substation apparatus substantial advances have been made toward the goal of reducing the effort and time required of a telephone subscriber in establishing a connection between his own set and a distant called set. It has long been recognized that a basic step toward that goal is to eliminate the requirement for a customer repeatedly to manipulate pushbuttons or a telephone dial finger wheel. The elimination of manual dialing has a twofold purpose in that it renders the service basically more attractive by reducing the various physical manipulations which a subscriber is called upon to perform and further it, in effect, increases the call-handling capacity of the central office switching equipment by reducing the time required for the generation of dial pulses.

One illustrative type of repertory dialer employs magnetic drum storage and pulses generated by dial-driven contacts are recorded on the drum. The dial may also be used for direct signaling on the line. Typically, the drum is of sufficient capacity to permit the storage of fifty or more directory numbers, each number being stored on a separate peripheral track. Selection of a directory number is accomplished by moving an indicator into line with a name and number which appear on a name-number display panel. This movement is also arranged to place the RECORD-REPRODUCE head on the corresponding track of the drum. By pressing a RECORD button a motor is energized and the head and its associated circuits are switched to the RECORD mode of operation. As the dial is wound up, a clutch is engaged causing the motor to drive the drum. As the dial unwinds, the dial pulses are recorded.

When the recording is complete, a RESET button is operated by the subscriber which causes the drum to complete its revolution to its starting point or index position at a very high rate of speed. Typically this fast reset action is accomplished through means of a second clutch and a high-speed gear train.

Automatic dialing out of a recorded directory number is initiated by depressing a CALL button. In the CALL mode the drum is rotated at the same speed as that used for recording and in this way the timing from the dial controls the timing of outpulsing. An illustrative magnetic repertory dialer station set of the general type described is shown, for example, in Patent 2,941,043, issued to J. H. Ham et al., June 14, 1960.

In repertory dialers of the type described, certain problems have arisen which require solution in order to ensure the highest possible level of operational reliability. For example, discontinuities and imperfections in the magnetic material on the drum may occur which produce corresponding irregularities in the form, make-break ratio and rate of the recorded pulses. Consequently, signals which are automatically applied to the telephone line during the CALL cycle may not be representative of the directory number desired. Moreover, in prior art arrangements, pulses extracted from storage are known to be potentially subject to distortion by random noise and by 60 cycle interference. As a result of the problems noted, calls which may be recorded properly, in so far as action by the subscriber is concerned, may fail to accomplish the desired connection. In some instances, therefore, the advantages of repertory dialing may, in effect, be secured only at the expense of a reduction in reliability.

Additionally, maintenance problems have been created in prior art dialers by the employment of a multiplicity of mechanical elements such as clutches and gear trains. For example, as indicated above, a separate clutch and gear train combination is required solely for the performance of high-speed RESET.

Accordingly, a specific object of the invention is to increase the reliability of repertory dialers of the magnetic drum type.

Another object of the invention is to avoid the ambiguities which occur in reading out signal pulses from a repertory dialer as a result of imperfections and discontinuities in the magnetic material of the drum.

A further object of the invention is to reduce the effect of electrical interference in the signals extracted from the magnetic drum of a repertory dialer.

These and other objects are attained in accordance with the principles of the invention by a magnetic drum repertory dialer which employs a carrier frequency generator or oscillator. Dial pulses, rather than being recorded directly, are employed to modulate a carrier frequency signal and consequently a sine wave burst is recorded on the drum for each dial pulse. No spaces are left on the drum between the bursts, but intervals are introduced during read-out by moving the drum in discrete steps. Discrete-step rotation of the drum in both the RECORD and CALL modes is accomplished through a drum-mounted ratchet wheel which is driven by a solenoid-actuated arm. In this way the digit 7, for example, is represented by a sine wave recorded consecutively in seven spaces. Interdigital gaps on the drum are provided, in accordance with the invention, by driving the drum ratchet with an auxiliary solenoid under the control of a set of auxiliary OFF-NORMAL contacts.

In the CALL mode of operation, as in the prior art, an amplifier is employed to amplify the recorded pulses during read-out before they are reconstituted and applied to the line. In accordance with the principles of the invention, however, the operation of the RECORD button is arranged to complete a feedback path around the amplifier, thereby converting the amplifier into an oscillator which serves as the carrier frequency generator. Additionally, in accordance with the invention, direct-current bias is automatically supplied to the head for erasure by the operation of the RECORD button. The direct-current bias then erases the information previously stored. When the finger wheel is released, the solenoid is stepped the required number of times by the dial-generated pulses and the oscillator supplies carrier frequency to the head. Accordingly, the actual shape of the signal recorded is determined by a combination of both direct-current and alternating-current inputs. Abrupt changes in the magnetic state of the drum surface, whether caused by surface imperfections or spurious signals, are accordingly not likely to be translated into spurious output pulses but instead are interpreted as a part of the recorded oscillatory signal.

In accordance with one aspect of the invention the RESET button is arranged to initiate the operation of a free-running multivibrator which drives the stepping solenoid at a high speed until the drum reaches its zero or index position. Controlling the speed of the stepping solenoid electronically to provide a relatively slow speed during the RECORD and CALL cycles and a relatively high speed during the RESET cycle eliminates the prior art need for an additional clutch and gear train combination.

In one illustrative embodiment of the invention the operation of the CALL button disconnects the direct-current bias as well as the carrier signal from the head and connects the head to the oscillator circuitry. At this point, however, the oscillator circuitry has been opened, or, more specifically, the feedback path has been opened, and the so-called oscillator is in fact an amplifier. The amplifier is tuned by design to the frequency of the recorded carrier signal which may be 1 kc. for example. The output from the amplifier is integrated and used to trigger a monostable multivibrator once for each solenoid movement, thereby providing the required pulses to the line.

Accordingly, one feature of the invention is a magnetic drum repertory dialer which includes means for rendering the timing characteristics of the output signals indepedent of those of the input pulses.

A further feature of the invention resides in a ratchet wheel which is integrally mounted on the magnetic drum of a repertory dialer and in a means for driving the ratchet wheel in discrete steps in response to the operation of a multivibrator-driven solenoid.

Another feature of the invention resides in a repertory dialer which includes a means for recording dial pulses in the form of successive immediately adjacent bursts of an oscillatory signal and in a means for translating the recorded bursts into direct-current pulses suitable for application to the line.

An additional feature of the invention pertains to a fast RESET means for a magnetic drum repertory dialer which means includes electronic control circuitry in lieu of the multiclutch and gear train arrangements of the prior art.

These and other objects and features of the invention will be fully apprehended by reference to the following detailed description of an illustrative embodiment and to the appended drawing in which.

Figure 1:
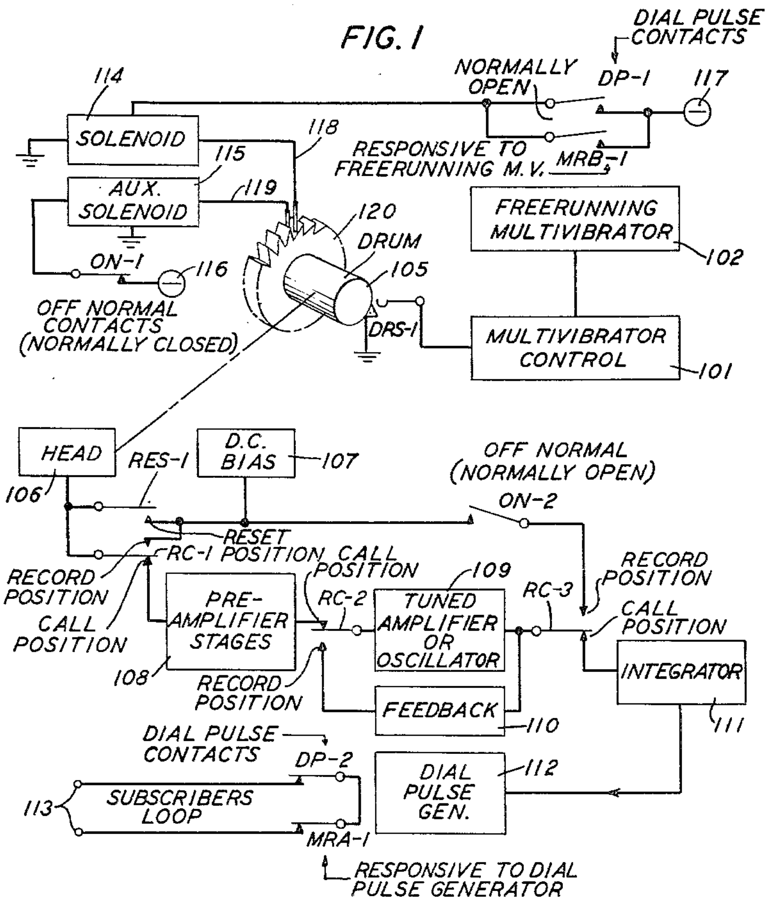
FIG. 1 is a block diagram of a magnetic drum repertory dialer in accordance with the invention.

As indicated by the functional block diagram of the embodiment shown in FIG. 1, in a repertory dialer in accordance with the invention a magnetic drum 105 is arranged to be driven by a ratchet wheel 120. The ratchet wheel 120 is in turn driven by an actuating pawl 118 and its associated solenoid 114 or by an auxiliary pawl 119 and its associated auxiliary solenoid 115. Power supply 117 is extended to operate solenoid 114 over a path which includes conventional dial pulse contacts DP–1 or alternatively over a path which includes the contacts MRB–1. The contacts MRB–1 are designed to be responsive to the operation of a free-running multivibrator 102 which may be accomplished through the employment of a magnetic reed relay, for example. Power supply 116 is extended to operate auxiliary solenoid 115 over a path which includes the normally closed OFF-NORMAL contacts ON–1.

The auxiliary solenoid 115 through the timing of contacts ON–1 is designed to step drum 105 at the proper time to provide interdigital spacing. Solenoid 114 is stepped during the RECORD cycle by pulses generated by the operation of contacts DP–1 and during the CALL cycle by the operation of contacts MRB–1. In accordance with the invention, means other than a ratchet wheel may, of course, be employed to drive the magnetic drum. For example, a suitably designed stepping motor may be effective for this purpose.

The multivibrator control circuit 101 depends in part for its activation upon the operation of drum switch DRS–1 which in turn is operated in accordance with the movement and rotational position of drum 105. The multivibrator control circuit 101 is arranged to operate free-running multivibrator 102 during the CALL cycle and during RESET.

The RECORD-REPRODUCE head 106, which is placeed in conventional spaced juxtaposition to the drum 105, is supplied on demand with an erasing voltage from direct-current bias source 107. Preamplifier stages 108 are designed to provide preliminary amplification of pulses extracted by head 106 from drum 105 during the CALL cycle. Pulses so amplified are applied to the tuned amplifier 109 and then integrated by the integrator circuit 111. The output of integrator 111 is applied to operate a dial pulse generator 112. Outgoing pulses on the subscriber's loop 113 may be generated directly by the operation of dial pulse contacts such as DP–2, or by the operation of contacts MRA–1 which are designed to be responsive to the operation of the dial pulse generator 112. This may be accomplished by the utilization of a magnetic reed relay, for example.

The circuit alignment indicated schematically in FIG. 1 shows the position of the various interconnecting switches set for the CALL cycle. Typically, a repertory dialer employs a RECORD button, a RESET button and a CALL button. Operation of the appropriate button is designed to actuate the particular switches which control the alignment for the function indicated. For simplicity, the actuating buttons are not shown but all switches controlling either the RECORD or CALL function bear the designation RC and in each case the CALL position and the RECORD position is indicated. Switches controlling the RESET function are designated RES.

Switch RC–1 is shown in the CALL position which provides a conducting path from the head 106 to the preamplifier stages 108. The switch RC–2 in the CALL position provides a conducting path from the output of the preamplifier stages 108 to the input of tuned amplifier 109. Similarly, switch RC–3 provides a conducting path from the output of tuned amplifier 109 to the input of the integrator 111.

When the RECORD button (not shown) is operated, the RC switches are thrown to the opposite positions from that shown in FIG. 1. Thus, direct-current bias from the source 107 is connected directly to head 106, and the conducting path between head 106 and preamplifier 108 is opened. Additionally, with the switch RC–2 in the RECORD position, a feedback path 110 is completed around the tuned amplifier 109 which circuit then becomes an oscillator providing the designed carrier frequency. Further, the movement of switch RC–2 from the CALL position isolates the amplifier or oscillator from preamplifier 108. As the dial (not shown) is wound up the alternating-current input to the head from oscillator 109 is connected by OFF-NORMAL contacts ON–2.

Another OFF-NORMAL contact ON–1 opens releasing auxiliary solenoid 115. Drum 105 is stepped a suitable number of teeth to place it in its initial index position, or to provide an interdigital gap when the dial returns to normal. The direct-current bias which is applied to head 106 erases any information previously stored.

Figure 6:
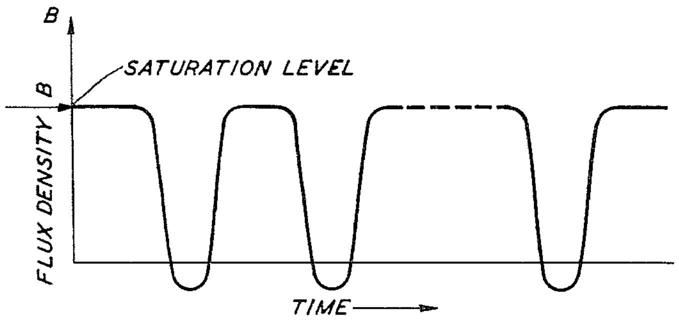
FIG. 6 is a plot of the type of waveform recorded on the magnetic drum of a repertory dialer in accordance with the invention.

When the dial is released, solenoid 114 is stepped the required number of times in the manner described above, but now oscillator 109 applies a tone signal to head 106. Oscillator 109 may have a designed frequency of 1 kc., for example. The shape of the signal which is actually recorded on drum 105 in response to the combination of direct-current and alternating-current inputs, as modified by the particular magnetic characteristics of the drum, is shown in FIG. 6. It will be noted that the oscillatory wave is, in effect, clipped at a point which represents the saturation level of the magnetic medium.

On completion of recording, a RESET button (not shown) is pushed manually to operate RESET switch RES–1. The alternating-current signal to drum 105 is interrupted and a switch in the multivibrator control circuit 101, also under control of the RESET button, causes free-running multivibrator 102 to drive solenoid 114 at a relatively high rate of speed until drum 105 reaches its zero position, at which point multivibrator 102 is disabled. It is this technique, which, in accordance with the invention, provides fast RESET while erasing any information on the unused part of the recording track. As indicated above, when the CALL button is pushed, solenoid 114 is driven by the same free-running multivibrator 102 except that in the CALL cycle multivibrator 102 is driven at a relatively slow rate.

Figure 3:
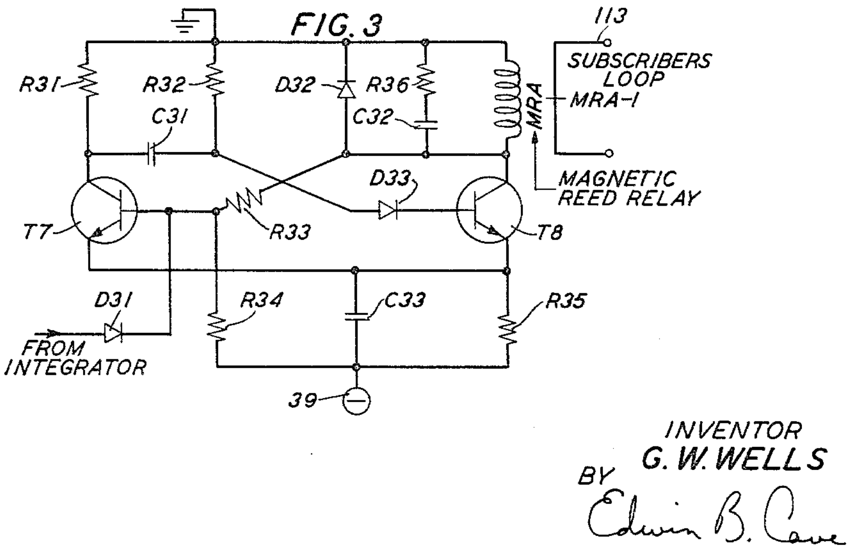
FIG. 3 is a schematic circuit diagram of the monostable multivibrator employed as the dial pulse generator.
Figure 2:
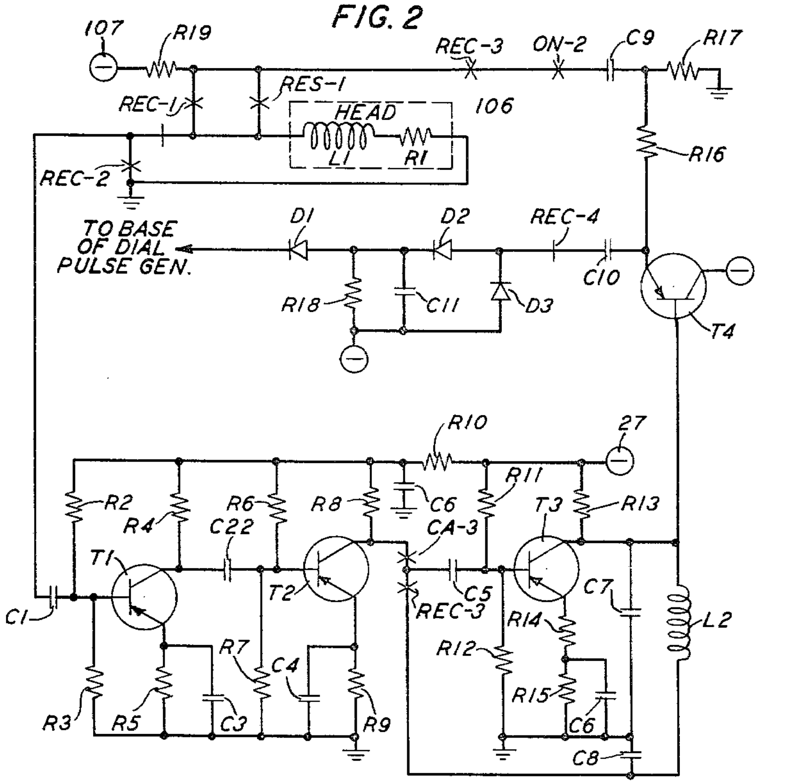
FIG. 2 is a schematic circuit diagram of the combined CALL-RECORD circuit shown in block form in FIG. 1.
Figure 4:
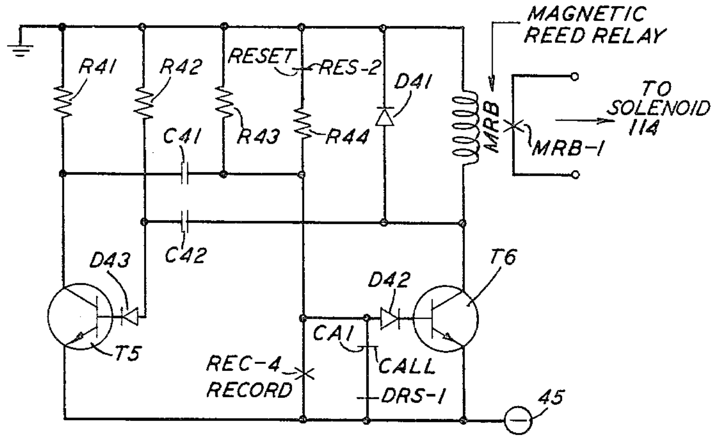
FIG. 4 is a schematic circuit diagram of a free-running multivibrator and its control circuitry which is employed for solenoid drive.

FIGS. 2, 3 and 4 are detailed schematic circuit diagrams of the arrangements shown in block form in FIG. 1. In each of these circuit diagrams conventional detached contact notation is employed with the usual "X" indicating a make contact and a "—" indicating a break contact. With reference now to FIG. 2, the RECORD-REPRODUCE head 106 is illustrated schematically by inductor L1 and resistor R1. Coupling to the preamplifier stages which include transistors T1 and T2 is afforded by capacitor C1. The arrangement of the preamplifier stages is substantially conventional, the transistors being connected in common emitter configuration with resistors R5 and R9, bypassed by capacitors C3 and C4, providing emitter bias. Resistors R2, R3, R6, and R7 perform the obvious voltage-dividing functions and resistors R4 and R8 are collector-load resistors for their respective transistors. Coupling between transistors T1 and T2 is provided by capacitor C22. A certain degree of decoupling is provided by resistor R10 and capacitor C6 in order to reduce the possibility of noise from power source 27 reaching the preamplifier.

The combination amplifier-oscillator includes transistors T3 and T4. The tank circuit, including capacitors C7 and C8 and inductor L2, determines the frequency of the oscillator. Collector load is provided by resistor R13. Voltage-dividing resistors R11 and R12 ensure the application of the proper biasing potential to the base of transistor T3 and resistors R14 and R15, with bypassing capacitor C6, comprise the emitter biasing circuit of transistor T3. Coupling between the output stage of the preamplifier and the input stage of the amplifier is provided by capacitor C5. A feedback path which serves to convert the first stage of the amplifier into a carrier frequency generator or oscillator is completed through make contact REC–3.

The integrator circuit is substantially conventional and includes resistor R18 and capacitor C11 together with limiting diodes D1, D2 and D3. Coupling between the output of transistor T4 and the input of the integrator circuit is provided by capacitor C10.

Considering now the specific sequence of operations involved in the RECORD cycle, pressing the RECORD button (not shown) closes make contact REC–3, thus completing the feedback path around transistor T3. The carrier signal so generated is applied to the base of transistor T4 and amplified. The amplified oscillatory output of transistor T4 is applied by way of resistor R16, capacitor C9, OFF-NORMAL make contact ON–2, RECORD button make contact REC–3, RECORD button make contact REC–1, and thence to the recording head 106; direct-current bias for erasing purposes is applied to the head from the source 107 by way of resistor R19 and RECORD button make contact REC–1.

As indicated above, as the dial is wound up, the alternating-curent input to the head is applied by way of OFF-NORMAL contacts ON–2. To provide the necessary interdigital gap after a succession of recorded tone bursts indicative of a directory number digit, OFF-NORMAL contacts ON–1 reclose which in turn causes the operation of auxiliary solenoid 115, stepping the drum the required number of spaces. On successive pulls of the dial finger wheel the process described is repeated. Contiguous oscillatory tone burts are recorded on drum 105 for each digit and after each digit a suitable interdigital space is generated on the drum.

Upon completion of recording a RESET button or other manual control is operated to actuate all contacts designated RES which action is also designed to release all other operated switches. During RESET the free-running multivibrator which is shown in FIG. 4 is made operative. The multivibrator circuit is substantially conventional and includes a pair of active elements, namely transistors T5 and T6 which are base-to-collector cross-coupled by means of capacitors C41 and C42 and diode D42. Proper operating voltages are established by resistors R41, R42, R43, and R44 in conjunction with the direct-current source 45. The rate of the multivibrator is established by the time constant of capacitor C41 and resistor R43 or by the combination of capacitor C41 together with both of the resistors R43 and R44. Resistor R44 is in effect added to the circuit by the operation of make contact RES–2 and a comparatively high-speed mode of operation results which is effective to drive solenoid 114 at fifty operations per second, for example, until drum 105 reaches its zero or index position.

The multivibrator control circuit 101 in FIG. 1 includes, as shown in FIG. 4, RECORD button make contact REC–4, CALL button break contact CA–1 and the drum switch break contact DRS–1. The contacts in the multivibrator control circuit provide alternative base-to-emitter shorting paths for the operation of the multivibrator and when either of these paths is open the multivibrator will operate. As indicated above, break contact DRS–1 is operative when the drum 105 rotates. Output pulses generated by the multivibrator are applied to the coil of the magnetic reed relay MRB to operate make contacts MRB–1, also shown in FIG. 1. Diode D41 is provided as a discharge path to avoid overshoot in the output pulses.

The sequence of operations involved in the CALL function is initiated by the operation of all switches designated CA, which may be effected by a manually operated CALL key, for example. Any other key such as the RECORD or RESET key and their associated contacts are automatically released. Such interaction of repertory dialer control keys is well known and is shown, for example, in the patent to Ham et al., cited above. Since the drum switch DRS–1 is closed at this point, the shorting path for transistor T6 of the multivibrator circuit is opened at break contact CA–1 and the multivibrator of FIG. 4 is activated. With the first movement of drum 105, drum switch DRS–1 opens and although with the release of the CALL key, which is conventionally nonlocking, contacts CA–1 close and the multivibrator continues to operate. Solenoid 114 is driven at a relatively slow speed, which may be ten operations per second, for example. When the rotation of drum 105 is complete, the drum switch DRS–1 is again closed, stopping the drum.

During the CALL cycle, while the head 106 is being rotated in discrete steps as described, the output from the head is applied by way of capacitor C1 to the base of transistor T1. The resulting signal at the collector of transistor T1 is applied for further amplification by way of capacitor C22 to the base of transistor T2. The RECORD button make contact REC–3 is open and accordingly transistor T3 and its associated circuitry operates as a stage of amplification rather than as an oscillator, as is the case in the RECORD cycle. Hence, the signal at the collector of transistor T2 is applied to the base of transistor T3 by way of the CALL button make contact CA–3 and capacitor C5. The output at the collector of transistor T3 is applied to the base of emitter-follower transistor T4 and thence by way of capacitor C10 and the RECORD button break contact REC–4 to the integrator circuit previously described. With drum 105 rotating at the rate of ten operations per second, the 1 kc. signal, amplified as described, is integrated over each 10 millisecond interval. Before the end of any 10 millisecond interval, however, a voltage level is reached which is sufficient to trigger the dial pulse generator which is shown in FIG. 3. The triggering voltage is applied to the base of transistor T7 by way of diode D31. The dial pulse generator is a substantially conventional monostable multivibrator which includes transistors T7 and T8. Base-to-collector crosscoupling is achieved through resistor R33 and through capacitor C31 and diode D33. Resistors R31, R32, R34 and R35, in conjunction with direct-current supply 39, establish the required operating voltages. The operating time is established by the time constant of resistor R32 and capacitor C31. Any small gaps in the 10 millisecond alternating-current signals due to imperfections in the surface of the drum, are eliminated by the integrator circuit shown in FIG. 2.

When triggered, the dial pulse generator shown in FIG. 3 remains in its quasi-stable state for a period which represents the desired width of a dial pulse, which may be 60 milliseconds, for example. The collector load for the output transistor T8 of the dial pulse generator is the coil of a magnetic reed relay MRA. Magnetic reed relay contact MRA–1, in operating, applies the reconstituted dial pulses to the line. If solenoid 114 (FIG. 1) is being driven at ten operations per second, as described, then the repetition rate of the reconstituted dial pulses is ten per second. It it is desired to read out at a different speed then, in accordance with the principles of the invention, it is only necessary to change the free-running rate of the solenoid and to adjust the quasi-stable time of the monostable multivibrator. It is not necessary to rerecord all the numbers on the drum in order to vary the read-out rate. Additionally, it should be noted that since the solenoid operation is identical for both the RECORD and CALL modes, the variations in track speed during the 10 millisecond steps which may result from acceleration, for example, will not shift the output signal from its designed frequency.

It is known that the output level of an oscillatory signal extracted from a magnetic drum is a function of drum speed and further that for each signal frequency there is a corresponding drum speed which will produce maximum signal output level. This principle is turned to account in accordance with the discrete drive feature of the invention which permits a drum speed approximately ten times as great as that employed in the conventional continuous-drive drum arrangements of the prior art. As a result, a correspondingly high recording frequency such as 1 kc., for example, may be employed, and the output level achieved is approximately a hundred times as great as would otherwise be possible.

Figure 5:
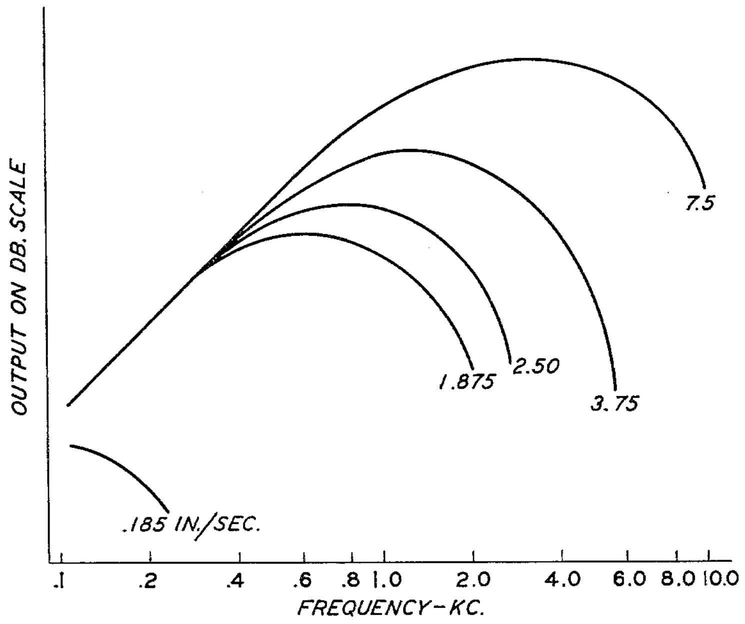
FIG. 5 is a plot of the frequency-versus-output characteristics of a recording head in accordance with the invention.

The family of curves shown in FIG. 5 is a plot of the output level-versus-frequency characteristics of magnetic drum RECORD-REPRODUCE heads at different drum speeds. Assuming a drum of about one inch diameter, it has heretofore been conventional practice to drive the drum at a relatively constant speed such that a single revolution during read-out is completed in approximately 18 seconds. The speed at the head under such conditions is accordingly about .185 inch per second. At this slow speed the output from the head for a recorded alternating-current signal is, however, very small. In accordance with the principles of the invention, and assuming no change in the drum size, a track segment or bit which conventionally is passed under the head in one-tenth of a second during read-out now passes in ten milliseconds and the track speed is zero for the remaining 90 milliseconds which gives a surface speed of 1.85 inches per second. At this higher speed an alternating-current signal of 1 kc. is practical and, as evident from the plot, close to an optimum frequency for maximum output. It will be noted that this output is one hundred times greater than at .185 inch per second.

It is to be understood that the embodiment disclosed herein is merely illustrative of the principles of the invention. Numerous other arrangements may be devised by persons skilled in the art without departing from the spirit and scope of the invention.

What is claimed is:

1. A repertory dialer adapted for connection to a telephone line comprising, in combination, repertory storage means, oscillator means, means for recording a directory number in said storage means in the form of groups of signals generated by said oscillator, means for shifting said dialer from a record to a reproduce mode, means including switching means responsive to said mode shifting means for converting said oscillator means into signal amplifying means, means for extracting said groups of signals recorded by said storage means, means for applying extracted ones of said groups of signals to said amplifying means, and means including a multivibrator circuit for applying amplified ones of said groups of signals to said telephone line in the form of direct-current pulses.

2. Repertory dialer apparatus adapted for connection to a telephone line comprising, in combination, repertory storage means including a rotatable magnetic drum, means for generating dial pulses, means responsive to each of said dial pulses for rotating said drum successively in a uniform discrete step, means for generating a continuous oscillatory signal, means responsive to said generating means for recording each digit of a directory number on said drum in the form of successive unspaced bursts of said oscillatory signal, the duration of each of said bursts being determined by the peripheral length of one of said steps, and means for applying a recorded one of said numbers to said line in the form of direct current pulses.

3. A repertory dialer adapted for connection to a telephone line comprising, in combination, repertory storage means including a rotatable magnetic drum, means for generating dial pulses, means responsive to each of said dial pulses for rotating said drum in a uniform discrete step, means including an oscillator circuit having a feedback path for generating an oscillatory signal, means for recording on said drum a continuous burst of said signal having a duration determined by the peripheral length of one of said steps, means for translating said recorded signal into a corresponding electrical signal, means for shifting said dialer from a record to a reproduce mode, means including switching means responsive to said shifting means for converting said generating means into amplifying means, means for applying said electrical signal to said amplifying means, and thence to said telephone line in the form of direct-current pulses.

4. Apparatus in accordance with claim 3 wherein said converting means includes means for opening said feedback path.

5. A repertory dialer adapted for connection to a telephone line comprising, in combination, repertory storage means including a rotatable magnetic drum and a combination recording-erase-readout head therefor, means for generating dial pulses, means responsive to each of said dial pulses for rotating said drum in a discrete step, means for generating an oscillatory signal, means for recording a directory number on said drum in the form of successive bursts of said oscillatory signal, the duration of each of said bursts being determined by the peripheral length of one of said steps, the duration of a group of said bursts being indicative of a respective one of the digits of said directory number, means for shifting said dialer from a record to a reproduce mode, means including said head for extracting recorded ones of said bursts from said storage means, means including switching means, responsive to said shifting means, for converting said oscillatory signal generating means to amplifying means, means for applying extracted ones of said signals to said amplifying means, means for translating the output of said amplifying means into direct-current pulses, and means for applying said direct-current pulses to said line.

6. Apparatus in accordance with claim 5 wherein said rotating means includes a solenoid, a free-running multivibrator for driving said solenoid and circuit means responsive to said dial pulse generating means for controlling said multivibrator.

7. Apparatus in accordance with claim 5 wherein said switching means includes means for opening a feedback path around said oscillatory generating means whereby said last named means is converted into said amplifying means.

8. Apparatus in accordance with claim 6 wherein said rotating means includes a ratchet wheel in driving relation to said drum and means responsive to the operation of said solenoid for driving said ratchet wheel.

9. A repertory dialer adapted for connection to a telephone line comprising, in combination, means for generating dial pulses representative of a directory number, amplifying means, repertory storage means including a rotatable magnetic drum and a combination record-erase-readout head therefor, means including a multivibrator driven solenoid and a ratchet wheel for rotating said drum in discrete steps, means for initiating a recording cycle, means responsive to said initiating means for introducing a feedback path to said amplifying means thereby converting said amplifying means into oscillatory signal generating means, means responsive to said initiating means for applying a direct-current bias to said head, means responsive to said initiating means and to said pulse generating means for driving said multivibrator means whereby said drum is rotated in discrete steps and means for applying a continuous burst of oscillatory signals from said generating means to said drum whereby said last named oscillatory signals as modified by said direct-current bias is recorded on said drum, the number of said recorded bursts being determined by the number of said discrete steps which are allowed to occur during the recording of each digit of a directory number, means for initiating a call cycle, means responsive to said last named means for opening said feedback path thereby converting said oscillatory signal generating means into said amplifying means, an integrator circuit including an input point and an output point, means for extracting recorded ones of said bursts from said head and for applying said last named bursts to said amplifier, a dial pulse generator including a second multivibrator circuit having an input point and an output point, means responsive to the operation of said call cycle initiating means for applying the output of said amplifying means to the input point of said integrator, means connecting the output point of said integrator to the input point of said pulse generator, and means for applying the output of said pulse generator to the line.

10. Apparatus in accordance with claim 9 wherein said pulse generator comprises a multivibrator circuit and wherein said means for applying the output of said pulse generator to the line comprises a sealed reed switch.

11. A repertory dialer adapted for connection to a telephone line comprising, in combination, a rotatable magnetic storage drum, an oscillator circuit including a feedback path for generating oscillatory signals, means for generating dial pulses, means including a ratchet wheel driven by a first solenoid for rotating said drum in discrete steps in response to said pulse generating means, means for applying said oscillatory signals to said drum during the discrete step rotation of said drum whereby successive, contiguous tone bursts of said oscillatory signals are recorded on said drum for each digit of a dialed directory number, the total number of said bursts in any group of bursts being indicative of a dialed digit, means including a second solenoid responsive to the operation of a set of off-normal contacts for driving said ratchet wheel and said drum a preselected number of said discrete steps upon the termination of the recording of a digit thereby to provide interdigital spacing during the recording of a directory number for extracting said tone bursts recorded on said drum, means operative upon the initiation of a call cycle for opening said feedback path to convert said oscillator circuit to an amplifier circuit thereby providing a means for amplifying tone bursts extracted by said head, means for integrating amplified ones of said tone bursts, a first multivibrator circuit operative during the call cycle for generating pulses and for applying said last named pulses to said first solenoid thereby rotating said drum in discrete steps, a second multivibrator circuit responsively operative to the output of said integrating means, means including a magnetic reed relay responsively operative to the output of said second multivibrator for applying direct-current pulses to said telephone lines, and means including switching means for shifting the operating rate of said first multivibrator to a relatively high level whereby said drum may be returned rapidly to a reference position.

12. Repertory dialer apparatus adapted for connection to a telephone line comprising, in combination, a manually operated signal device for generating a series of pulses indicative of a digit of a telephone directory number, a magnetic recording medium and a magnetic record-reproduce head, means responsive to said pulses for imparting relative movement between said medium and said head in the form of uniform discrete steps, each of said steps being indicative of the generation of one of said pulses, an alternating-current signal source, means for applying said source to said head during the operation of said device whereby magnetic indicia corresponding to successive signal bursts from said source are recorded on said medium, the duration of each of said bursts corresponding to the length of each of said steps, and means for translating each of said bursts into a single direct current pulse and for applying said last named pulse to said line.

References Cited by the Examiner

UNITED STATES PATENTS

| | | | |
|---|---|---|---|
| 2,654,003 | 9/1953 | Doshiell | 331—59 |
| 3,040,133 | 6/1962 | Kobler et al. | 179—90 |

FOREIGN PATENTS

| | | |
|---|---|---|
| 860,794 | 2/1961 | Great Britain. |
| 567,446 | 11/1958 | Belgium. |

ROBERT H. ROSE, *Primary Examiner.*